(12) United States Patent
Xu et al.

(10) Patent No.: US 12,169,421 B2
(45) Date of Patent: Dec. 17, 2024

(54) DISPLAY MODULE AND DISPLAY DEVICE

(71) Applicant: BOE Technology Group Co., Ltd., Beijing (CN)

(72) Inventors: Linlin Xu, Beijing (CN); Shangchieh Chu, Beijing (CN); Shiming Shi, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 237 days.

(21) Appl. No.: 17/920,740

(22) PCT Filed: Jun. 8, 2021

(86) PCT No.: PCT/CN2021/098813
§ 371 (c)(1),
(2) Date: Oct. 21, 2022

(87) PCT Pub. No.: WO2022/017021
PCT Pub. Date: Jan. 27, 2022

(65) Prior Publication Data
US 2023/0170929 A1    Jun. 1, 2023

(30) Foreign Application Priority Data
Jul. 24, 2020  (CN) .......................... 202010728417.5

(51) Int. Cl.
*G06F 1/16* (2006.01)
*H04M 1/02* (2006.01)
*H04B 1/3888* (2015.01)

(52) U.S. Cl.
CPC ........ *G06F 1/1637* (2013.01); *H04M 1/0269* (2022.02); *G06F 1/1626* (2013.01); *G06F 1/1652* (2013.01); *H04B 1/3888* (2013.01)

(58) Field of Classification Search
CPC .... G06F 1/1609; G06F 1/1626; G06F 1/1637; G06F 1/1652; H04M 1/0269
See application file for complete search history.

(56) References Cited

U.S. PATENT DOCUMENTS 10,054,988 B2 *  8/2018  Jin .......................... H10K 59/40
10,437,374 B2 * 10/2019  Lee ....................... H04M 1/026
(Continued)

FOREIGN PATENT DOCUMENTS

CN          204903913 U      12/2015
CN          205050499 U       2/2016
(Continued)

OTHER PUBLICATIONS

PCT/CN2021/098813 international search report.

*Primary Examiner* — Nidhi Thaker
(74) *Attorney, Agent, or Firm* — IPro, PLLC

(57) ABSTRACT

Disclosed are a display module and a display device. The display module includes a rear shell and an intermediate frame, and a display screen, an ultra-thin protective cover plate, and a protective film. The rear shell has a back plate and a first folded edge bent and extending from the edge of the back plate to the side of the display screen. The intermediate frame is located in a region enclosed by the back plate and the first folded edge. The ultra-thin protective cover plate has a first surface away from the side of the display screen, and a side surface located on the edge. The protective film includes a first part attached to the first surface of the ultra-thin protective cover plate, and a second part coating the side surface of the ultra-thin protective cover plate.

20 Claims, 5 Drawing Sheets

(56) References Cited

U.S. PATENT DOCUMENTS

| | | | |
|---|---|---|---|
| 10,749,136 B2 * | 8/2020 | Lee | G06F 3/0414 |
| 10,980,137 B2 * | 4/2021 | Ji | H10K 59/873 |
| 2013/0002133 A1 * | 1/2013 | Jin | H10K 59/128 |
| | | | 313/511 |
| 2015/0334211 A1 * | 11/2015 | Shin | G06F 1/1637 |
| | | | 455/566 |
| 2016/0172623 A1 | 6/2016 | Lee | |
| 2016/0293869 A1 | 10/2016 | Saeki et al. | |
| 2017/0003716 A1 | 1/2017 | Chong et al. | |
| 2017/0098794 A1 * | 4/2017 | Cho | H04M 1/0269 |
| 2017/0171939 A1 | 6/2017 | Yang et al. | |
| 2020/0251671 A1 | 8/2020 | Chu | |
| 2022/0102675 A1 * | 3/2022 | Lee | G06F 1/1637 |

FOREIGN PATENT DOCUMENTS

| | | | | |
|---|---|---|---|---|
| CN | 205334000 U | | 6/2016 | |
| CN | 205336419 U | | 6/2016 | |
| CN | 106023811 A | | 10/2016 | |
| CN | 106940966 A | | 7/2017 | |
| CN | 107004698 A | | 8/2017 | |
| CN | 107025851 A | | 8/2017 | |
| CN | 206589410 U | * | 10/2017 | B32B 17/06 |
| CN | 206657594 U | | 11/2017 | |
| CN | 107864243 A | | 3/2018 | |
| CN | 207282084 U | | 4/2018 | |
| CN | 208673633 U | | 3/2019 | |
| CN | 208938549 U | | 6/2019 | |
| CN | 110391279 A | | 10/2019 | |
| CN | 111710247 A | | 9/2020 | |
| CN | 212365388 U | | 1/2021 | |

\* cited by examiner

DISPLAY MODULE AND DISPLAY DEVICE

CROSS REFERENCE TO RELATED APPLICATIONS

The present disclosure is a US National Stage of International Application No. PCT/CN2021/098813, filed on Jun. 8, 2021 which claims priority to Chinese Patent Application No. 202010728417.5, filed to the China Patent Office on Jul. 24, 2020 and entitled "DISPLAY MODULE AND DISPLAY DEVICE", the entire contents of which are incorporated herein by reference.

FIELD

The present disclosure relates to the field of display, in particular to a display module and a display device.

BACKGROUND

At present, some manufacturers of curved and folded display products, such as mobile phone manufacturers, have introduced a solution of adopting ultra-thin flexible glass (UTG) to protect flexible display screens; and the ultra-thin flexible glass (UTG) has the characteristics of being ultra-thin and foldable, good in flexibility, having smooth hand feeling and good uniformity, and being capable of effectively avoiding screen damage relative to polymer protective films.

However, due to the relatively large hardness of the ultra-thin glasses, excessive rebound force is easily generated on edges during attaching of a curved screen or bending, resulting in film separation, and affecting the yield of the display products.

SUMMARY

The present application discloses a display module and a display device, so as to alleviate poor film separation of a flexible display product using ultra-thin glasses, etc., and increase the yield of a display product.

In order to achieve the above objectives, the present application provides the following technical solutions.

A display module includes a rear cover and a middle frame, and a display screen, an ultrathin protective cover plate, and a protective film which are located on a side of the middle frame facing away from the rear cover and are stacked in sequence; wherein the rear cover has a back plate and a first folded edge bent and extending from an edge of the back plate to one side of the display screen; the middle frame is located in a region enclosed by the back plate and the first folded edge; the ultrathin protective cover plate has a first surface facing away from one side of the display screen and a side surface located on the edge; and the protective film includes a first part attached to the first surface of the ultrathin protective cover plate, and a second part coating the side surface of the ultrathin protective cover plate and extending between the middle frame and the first folded edge of the rear cover.

Optionally, a shape of the ultrathin protective cover plate is square, and at least one side edge of the ultrathin protective cover plate is bent towards one side of the rear cover; and the second part of the protective film coats the edge side surface of the at least one side edge of the ultrathin protective cover plate and extends between the middle frame and the first folded edge of the rear cover.

Optionally, a bending angle of the edge of the ultrathin protective cover plate towards one side of the rear cover is smaller than or equal to 90 degrees.

Optionally, the display screen includes a square screen part, and a bent part located on a first side of the screen part and bent to a non-display surface of the screen part; the ultrathin protective cover plate is attached to the screen part, and the side edge of the ultrathin protective cover plate close to the first side edge is bent towards one side of the rear cover; and the second part of the protective film coats the edge side surface of the ultrathin protective cover plate close to the first side edge and extends between the middle frame and the first folded edge of the rear cover.

Optionally, the second part of the protective film and the first folded edge of the rear cover are pasted and fixed.

Optionally, the second part of the protective film and the first folded edge of the rear cover are pasted through a double faced adhesive tape.

Optionally, the second part is provided with an opening at a position between the middle frame and the first folded edge of the rear cover; and an inner side of the first folded edge is provided with a protruding part matched with the opening, and the protruding part is embedded into the opening.

Optionally, a shape of the ultrathin protective cover plate is rectangular, and two opposite long side edges of the ultrathin protective cover plate are bent towards one side of the rear cover; and the second part of the protective film includes two parts, and the two parts are respectively located on two sides of the first part close to the two long side edges, and respectively coat side surfaces of the two long side edges of the ultrathin protective cover plate and extend between the middle frame and the first folded edge of the rear cover.

Optionally, each of the two parts is provided with the plurality of openings, and the plurality of openings are arranged and distributed along the long side edge of the ultrathin protective cover plate; and the inner side of the first folded edge is provided with a plurality of protruding parts matched with the plurality of openings in a one-to-one correspondence mode, and the protruding parts are embedded into the corresponding openings.

Optionally, the display module further includes a clamp arranged in a region enclosed by the back plate of the rear cover and the first folded edge, and configured to clamp and fix the middle frame and the second part of the protective film.

Optionally, the middle frame includes a main body part opposite to the back plate of the rear cover and used to bear the display screen and the ultrathin protective cover plate, and a second folded edge bent from an edge of the main body part to one side of the back plate of the rear cover; the second part of the protective film extends between the second folded edge of the middle frame and the first folded edge of the rear cover; and the clamp is a full-surrounded frame or a semi-surrounded frame arranged along the second folded edge of the middle frame, and is provided with a clamping groove opened facing away from one side of the back plate of the rear cover, and the clamping groove clamps the second part of the protective film and the second folded edge of the middle frame.

Optionally, the clamp is an elastomer, and an opening size of the clamping groove is smaller than an internal size of the clamping groove.

Optionally, the clamp and the rear cover are pasted and fixed.

Optionally, the ultrathin protective cover plate is ultrathin glass.

Optionally, the protective film includes a transparent polyimide film or a terephthalic acid plastic film.

Optionally, the display module further includes a plastic diaphragm located between the display screen and the ultrathin protective cover plate, and the plastic diaphragm includes a transparent polyimide film or a terephthalic acid plastic film.

A display device includes any one of the above display modules.

DETAILED DESCRIPTION OF THE EMBODIMENTS

The technical solutions of the embodiments of the present application are described clearly and completely in combination with accompanying drawings of the embodiments of the present application below, apparently, the described embodiments are only a part of the embodiments of the present application, not all of the embodiments. Based on the embodiments of the present application, all other embodiments obtained by those of ordinary skill in the art without creative work shall fall within the protection scope of the present application.

Figure 1:
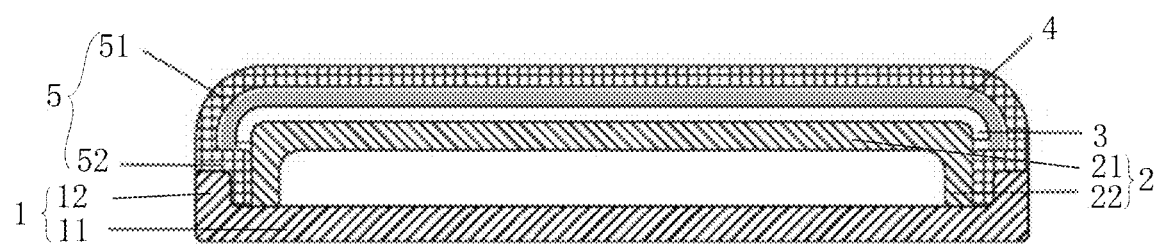
FIG. 1 is a section schematic structural diagram of a display module provided by an embodiment of the present application.

As shown in FIG. 1, an embodiment of the present application provides a display module, including a rear cover 1 and a middle frame 2, and a display screen 3, an ultrathin protective cover plate 4, and a protective film 5 which are located on a side of the middle frame 2 facing away from the rear cover 1 and are stacked in sequence.

The rear cover 1 has a back plate 11 and a first folded edge 12 bent and extending from an edge of the back plate 11 to one side of the display screen 3; the middle frame 2 is located in a region enclosed by the back plate 11 and the first folded edge 12.

The ultrathin protective cover plate 4 has a first surface facing away from one side of the display screen 3 and a side surface located on the edge.

The protective film 5 includes a first part 51 attached to the first surface of the ultrathin protective cover plate 4, and a second part 52 coating the side surface of the ultrathin protective cover plate 4 and extending between the middle frame 2 and the first folded edge 12 of the rear cover 1.

In the above display module, the protective film 5 coats the ultrathin protective cover plate 4, and includes two parts (the first part 51 and the second part 52), specifically, other than including the first part 51 attached to the first surface of the ultrathin protective cover plate 4, the protective film 5 further includes the second part 52 bent and extending from an edge of the first part 51 to an interior of the rear cover 1, and then, the ultrathin protective cover plate 4 is integrally coated in the protective film 5, but the edge part (the second part 52) of the protective film 5 is assembled and limited between the middle frame 2 and the first folded edge 12 of the rear cover 1, so when the ultrathin protective cover plate 4 is bent and attached to the edge (attached to the curved screen as shown in FIG. 1) or is changed in a bending mode, film separation will not generate with the display screen 3 due to the action of rebound force.

In conclusion, according to the display module provided by the embodiment of the present application, the situation of film separation caused by excessive rebound force when the ultrathin protective cover plate is attached to the curved screen or bent may be relieved, and the yield of display products is increased.

In some embodiments, the ultrathin protective cover plate 4 is ultra-thin glass (UTG).

Furthermore, the protective film 5 is a transparent polymer plastic film, and may include a transparent polyimide film (CPI) or a terephthalic acid plastic film (PET). For example, the protective film 5 may include the transparent polyimide film and a hardening coating located on a side of the transparent polyimide film facing away from the ultrathin protective cover plate 4, and the hardening coating may be an acrylate material.

The ultra-thin glass (UTG) is a glass layer with a thickness magnitude of dozens of microns and below, may be bent and deformed, and may be folded. Specifically, as early as four years ago, the Schott Glass manufacturer has produced 70-micron deformable ultra-thin glasses. At present, some phone manufacturers have already used Schott's 30-micron deformable glasses, and Schott further expresses that thicknesses of the glasses may be reduced to 25 microns in a laboratory. Specifically, relative to a polymer plastic film, ultra-thin glass may effectively avoid screen damage, and may simultaneously provide better optical definition; meanwhile, creases are not easily generated on the ultra-thin glass, and reliability is good; and the ultra-thin glass will not be spontaneously decomposed like plastics, and is long in life, thereby providing more stable and reliable protection for display screens.

Figure 2:
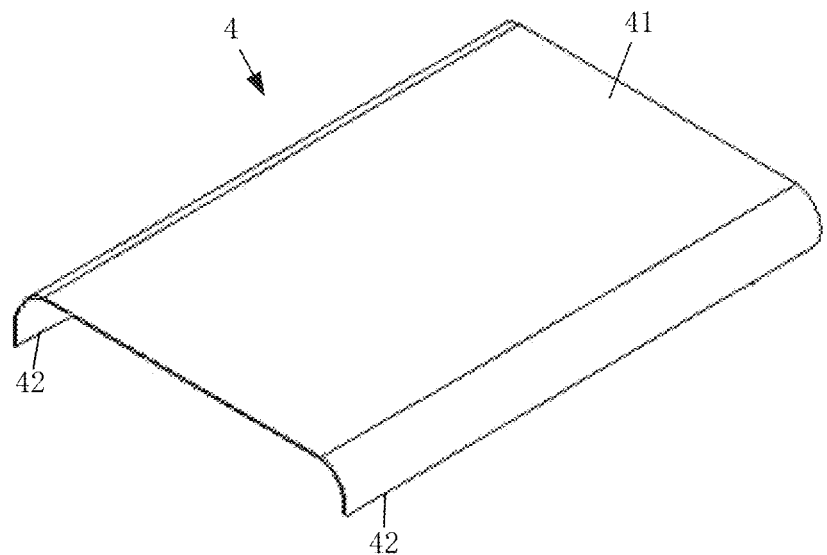
FIG. 2 is a schematic structural diagram of an ultrathin protective cover plate of a display module provided by an embodiment of the present application in a state of being attached to a curved screen in a bending mode.

In some embodiments, as shown in FIG. 1 and FIG. 2, a shape of the ultrathin protective cover plate 4 is square, and at least one side edge of the ultrathin protective cover plate 4 is bent towards one side of the rear cover 1.

Exemplarily, a bending angle of the edge of the ultrathin protective cover plate 4 towards one side of the rear cover 1 is smaller than or equal to 90 degrees.

Specifically, the display module of the embodiment of the present application may be a curved display module, the ultrathin protective cover plate 4 is a curved cover plate, and the display screen 3 is a curved screen with a bending shape being roughly the same with that of the ultrathin protective cover plate 4.

Exemplarily, the second part 52 of the protective film 5 coats the edge side surface of the at least one side edge of the ultrathin protective cover plate 4 and extends between the middle frame 2 and the first folded edge 12 of the rear cover 1. In other words, when the side edge of the ultrathin protective cover plate 4 is bent, a protective layer extends to form the second part 52 to coat and limit the side edge of the ultrathin protective cover plate 4, so as to avoid film separation between the bending edge of the side and the display screen 3 under the action of the rebound force.

In one specific embodiment, taking a display module of a curved mobile phone as an example, as shown in FIG. 1 and FIG. 2, wherein the display screen 3 is rectangular, and is a curved screen with two long side edges being bent; the ultrathin protective cover plate 4 is attached to the display screen 3, edge bending shapes of the two are roughly the same, that is, the ultrathin protective cover plate 4 is also rectangular, and two opposite long side edges are also bent towards one side of the rear cover 1. Specifically, an edge bending angle of the display screen 3 and the ultrathin protective cover plate 4 is roughly 90 degrees, and the edge of the ultrathin protective cover plate 4 may be aligned with the edge of the display screen 3, or exceed the edge of the display screen 3.

Figure 3:
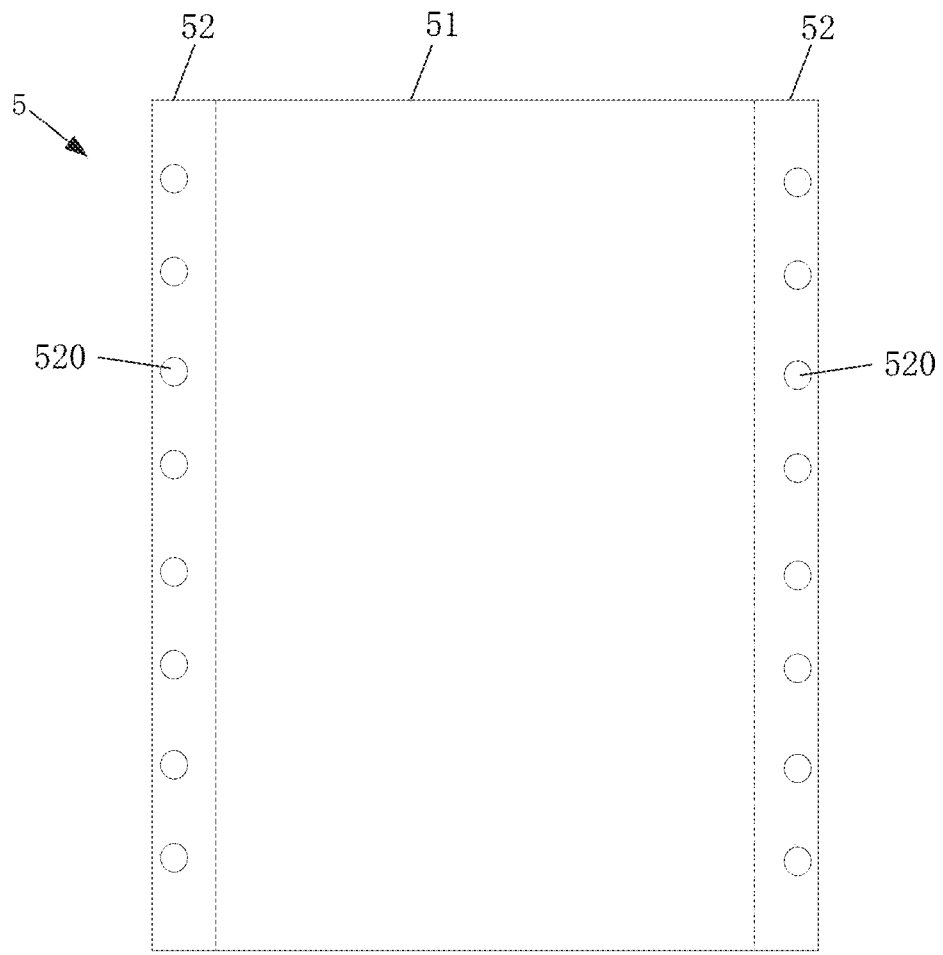
FIG. 3 is a schematic structural diagram of a protective film of a display module provided by an embodiment of the present application in a flattening state.

Exemplarily, as shown in FIG. 1 to FIG. 3, the first part 51 of the protective film 5 is attached to a first surface 41 of the ultrathin protective cover plate 4, is roughly the same with the first surface 41 of the ultrathin protective cover plate 4 in shape, and is rectangular. The second part 52 of the protective film 5 includes two parts, the two parts are respectively located on two sides of the first part 51 close to the two long side edges, and respectively coat side edge side surfaces 42 of the two long sides of the ultrathin protective cover plate 4 and extend between the middle frame 2 and the first folded edge 12 of the rear cover 1.

Specifically, when the curved display module of the embodiment of the present application is applied to a mobile phone, the whole bending design of the mobile phone curved screen is beneficial for grasping, and is better attached to palm radian, so a distance of a thumb touching the screen during one-hand operation is reduced, and horizontal cross-screen operation experience under a large-size screen can be improved theoretically. The screen may become thinner, light in weight and lower in power consumption. In addition, the curved screen increases a visual angle, so an effect is also good from an off-centered angle.

Figure 4:
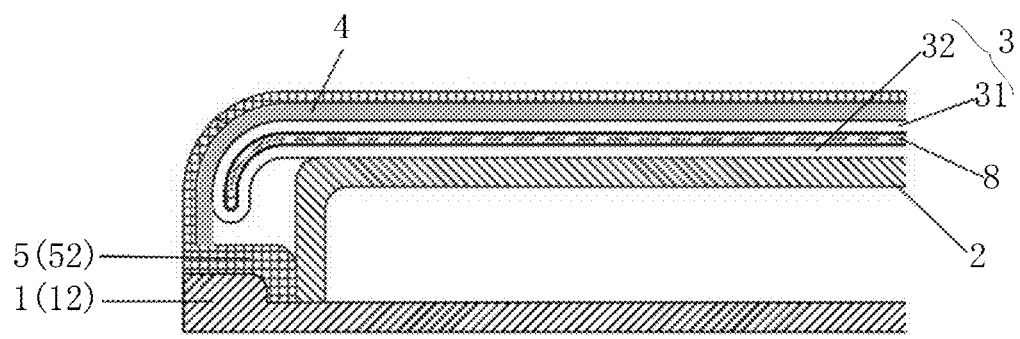
FIG. 4 is a section schematic structural diagram of a display module provided by another embodiment of the present application.

In a specific embodiment, as shown in FIG. 4, the display screen is a flexible display screen, and may include a square screen part 31, and a bent part 32 located at the first side edge of the screen part 31 and bent to a non-display surface of the screen part. Specifically, at the moment, the ultrathin protective cover plate 4 is matched with the screen part 31 in shape and attached to the screen part 31, and the side edge of the first side of the ultrathin protective cover plate 4 close to the screen part 31 is bent towards one side of the rear cover 1.

Exemplarily, at the moment, the second part 52 of the protective film 5 coats the side edge side surface of the ultrathin protective cover plate 4 close to the first side edge and extends between the middle frame 2 and the first folded edge 12 of the rear cover 1.

In other words, when the display screen includes the bent part 32 bent towards a back surface, a side close to the bent part 32 of the ultrathin protective cover plate 4 may be bent towards one side of the rear cover 1 to protect the curved screen of the side surface. Correspondingly, the protective film 5 may also extend on the side to form the second part 52, so as to avoid film separation of the bending edge of the side of the ultrathin protective cover plate 4 under the action of the rebound force with the display screen.

Exemplarily, taking the curved mobile phone as an example, wherein the screen part 31 of the display screen is rectangular, and the first side edge of the screen part 31 is a short edge of the screen part 31. Specifically, the two long side edges of the screen part 31 are bent towards one side of the rear cover 1 (as shown in FIG. 1), and the bent part 32 is bent along the first side edge of the screen part 31 to the back surface of the screen part 31 (as shown in FIG. 4). The ultrathin protective cover plate 4 is matched with the screen part 31 in shape and attached to the screen part 31, that is, the side of the two long side edges of the ultrathin protective cover plate 4 are bent towards one side of the rear cover 1 (as shown in FIG. 1), and the side edge of the ultrathin protective cover plate close to the first side edge of the screen part 31 is bent towards one side of the rear cover 1 (as shown in FIG. 4), thereby forming protection for side bending edges of the screen part 31. Correspondingly, the second part 52 of the protective film 5 simultaneously coats the above three side surfaces of the ultrathin protective cover plate 4 and extends between the middle frame 2 and the first folded edge 12 of the rear cover 1.

In some embodiments, as shown in FIG. 1, the second part 52 of the protective film 5 and the first folded edge 12 of the rear cover 1 are pasted and fixed, that is, an edge part of the protective film 5 and the first folded edge 12 of the rear cover 1 are pasted, so as to ensure that the edge of the protective film 5 is stably limited into the rear cover 1.

Exemplarily, double faced adhesive tape is arranged between the second part 52 of the protective film 5 and the first folded edge 12 of the rear cover 1 (not shown in the figure), and the second part 52 of the protective film 5 and the first folded edge 12 of the rear cover 1 are pasted through the double faced adhesive tape.

Figure 5:
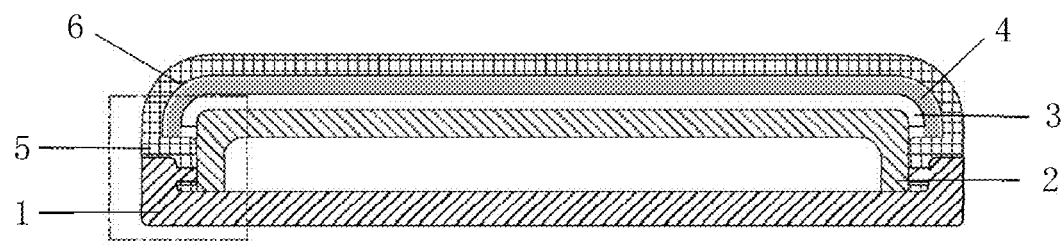
FIG. 5 is a section schematic structural diagram of a display module provided by another embodiment of the present application.
Figure 6:
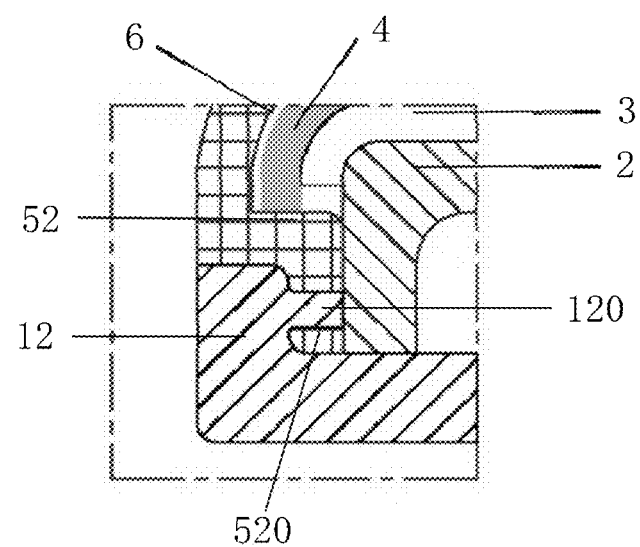
FIG. 6 is a partial amplified schematic structural diagram of the display module in FIG. 5 in a dotted line frame.

In some embodiments, as shown in FIG. 5 and FIG. 6, the second part 52 of the protective film 5 is provided with an opening 520 formed in a position between the middle frame 2 and the first folded edge 12 of the rear cover 1. Specifically, a protruding part 120 matched with the opening 520 is arranged on an inner side of the first folded edge 12 of the rear cover 1, and the protruding part 120 is embedded into the opening 520.

Specifically, clamping connection between the edge of the protective film 5 and the rear cover 1 may be achieved by using embedding of the protruding part 120 of the first folded edge 12 and the opening 520 of the second part 52, thereby further ensuring the stability of the edge of the protective film 5 being limited into the rear cover 1.

Exemplarily, as shown in FIG. 3, the second part 52 of the protective film 5 provided by the above specific embodiment includes two parts, at the moment, the plurality of openings 520 are formed in each of the two parts, and the plurality of openings 520 are arranged and distributed along the long side edge of the ultrathin protective cover plate (the long side edge of the first part 51). Furthermore, at the moment, the plurality of protruding parts 120 matched with the plurality of openings 520 in a one-to-one correspondence mode may be arranged on the inner side of the first folded edge 12 of the rear cover 1, and the protruding parts 120 are embedded into the corresponding openings 520.

Figure 7:
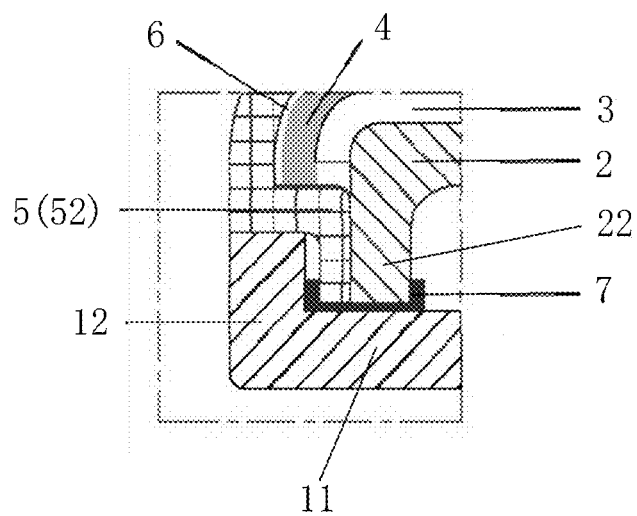
FIG. 7 is a partial amplified schematic structural diagram of a display module provided by another embodiment of the present application in the dotted line frame as shown in FIG. 5.

In some embodiments, as shown in FIG. 7, the display module provided by the embodiment of the present application may further include a clamp 7, the clamp 7 is arranged in a region enclosed by the back plate 11 of the rear cover 1 and the first folded edge 12, and is configured to clamp and fix the middle frame 2 and the second part 52 of the protective film 5, so the edge (the second part 52) of the protective film 5 is better limited into the rear cover 1.

Exemplarily, as shown in FIG. 1, the middle frame 2 includes a main body part 21 opposite to the back plate 11 of the rear cover 1 and used to bear the display screen 3 and the ultrathin protective cover plate 4, and a second folded edge 22 bent from an edge of the main body part to one side of the back plate 11 of the rear cover 1. The second part 52 of the protective film 5 extends between the second folded edge 22 of the middle frame 2 and the first folded edge 12 of the rear cover 1.

Figure 8:
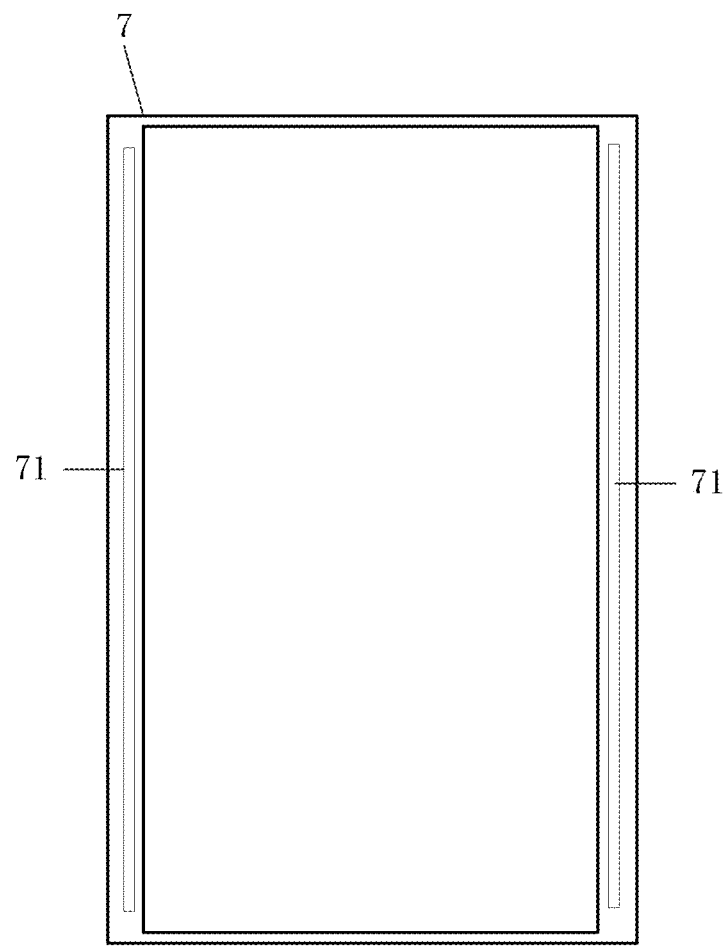
FIG. 8 is a schematic structural diagram of a clamp in a display module provided by an embodiment of the present application.

Furthermore, as shown in FIG. 1, FIG. 7 and FIG. 8, the clamp 7 may be a full-surrounded frame or a semi-surrounded frame arranged along the second folded edge 22 of the middle frame 2, and is provided with a clamping groove 71 opened facing away from one side of the back plate 11 of the rear cover 1, and the clamping groove 71 clamps the second part 52 of the protective film 5 and the second folded edge 22 of the middle frame 2. Specifically, the clamping groove 71 may be a strip-type groove or an annular groove extending along the second folded edge 22 of the middle frame 2. The second part 52 of the protective film 5 provided by the above specific embodiment includes two parts as an example (as shown in FIG. 3), at the moment, as shown in FIG. 8, the clamping groove 71 may include two strip-type grooves extending along the two long sides of the middle frame 2.

In some embodiments, the clamp 7 may be an elastomer; and an opening size of the clamping groove 71 in the clamp 7 is smaller than an internal size of the clamping groove 71. Specifically, the internal size of the clamping groove 71 is a radial size of a cross section. In other words, when the clamping groove 71 is a strip type or an annular, an internal width of the clamping groove 71 is greater than an opening width, so the second folded edge of the middle frame and the second part of the protective film are convenient to clamp, and clamping tightness may be improved. For example, a longitudinal section of the clamping groove 71 may be trapezoidal.

In some embodiments, the clamp 7 and the rear cover 1 may be pasted and fixed.

In some embodiments, in the display module provided by the embodiment of the present application, the display screen may be an OLED panel.

Figure 9:
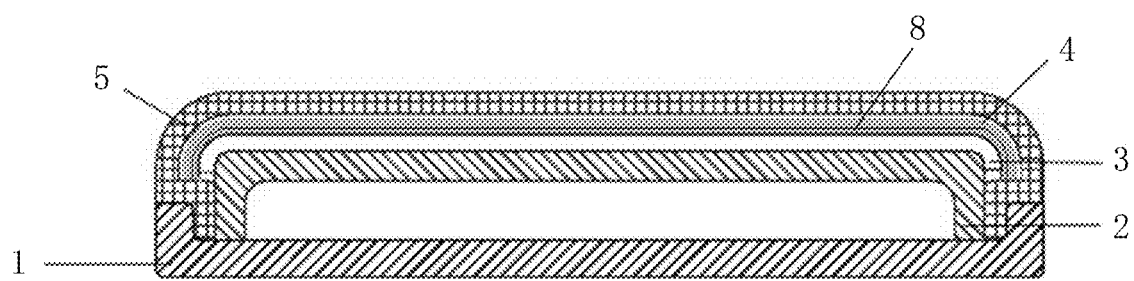
FIG. 9 is a section schematic structural diagram of a display module provided by another embodiment of the present application.

In some embodiments, as shown in FIG. 9, the display module provided by the embodiment of the present application may further include a plastic diaphragm 8 located between the display screen 3 and the ultrathin protective cover plate 4, and the plastic diaphragm 8 may be a transparent polymer plastic film, such as a transparent polyimide film (CPI) or a terephthalic acid plastic film (PET). Specifically, the plastic diaphragm 8 may be matched with the ultrathin protective cover plate 4 in shape, and surfaces of two sides are respectively attached to the ultrathin protective cover plate 4 and the display screen 3, and specifically attached through optical clear adhesive (OCA).

Specifically, the display module provided by the embodiment of the present application may further include the optical clear adhesive (OCA) 6 (as shown in FIG. 5 to FIG. 7) located between the display screen 3 and the ultrathin protective cover plate 4, and a radiating module (not shown in the figure) and a stainless steel supporting layer 8 (as shown in FIG. 4) located between the middle frame 2 and the display screen 3 and other structures, in addition, a main circuit board and other function modules (not shown in the figure) may further be included between the middle frame 2 and the rear cover 1, which is not repeated herein one by one.

In addition, the present application further provides a display device, and the display device includes any one of the above display modules.

Specifically, the display device may be an OLED display device, and may be specifically applied to a tablet personnel computer, a mobile phone and other display devices.

It should be noted that in some embodiments of the present disclosure, the display module and the display device may further include other structures, and further be decided according to actual demands, which is not limited by the embodiments of the present disclosure. In addition, size and material selection provided by structures of the embodiments of the present disclosure is not limited to the above embodiments, and basic requirements thereof may refer to the description above, which will not be repeated herein. Or, the accompanying drawings of the present application are only schematic diagrams, and sizes and proportions of structures in the figures will not represent actual size proportions of the structures.

It will be apparent to those skilled in the art that various modifications and variations may be made to the present disclosure without departing from the spirit or scope of the present application. In this way, if these modifications and variations of the present application fall within the scope of the claims of the present application and their equivalent art, the present application also intends to include these modifications and variations.

What is claimed is:

1. A display module, comprising:
   a rear cover and a middle frame; and
   a display screen, an ultrathin protective cover plate and a protective film which are located on a side of the middle frame facing away from the rear cover and stacked in sequence; wherein
   the rear cover has a back plate and a first folded edge bent and extending from an edge of the back plate to one side of the display screen;
   the middle frame is located in a region enclosed by the back plate and the first folded edge;
   the ultrathin protective cover plate has a first surface facing away from one side of the display screen and a side surface located on an edge; and
   the protective film comprises a first part attached to the first surface of the ultrathin protective cover plate, and a second part coating the side surface of the ultrathin protective cover plate and extending between the middle frame and the first folded edge of the rear cover.

2. The display module according to claim 1, wherein a shape of the ultrathin protective cover plate is square, and at least one side edge of the ultrathin protective cover plate is bent towards one side of the rear cover; and
   the second part of the protective film coats an edge side surface of the at least one side edge of the ultrathin protective cover plate and extends between the middle frame and the first folded edge of the rear cover.

3. The display module according to claim 2, wherein a bending angle of the edge of the ultrathin protective cover plate towards one side of the rear cover is smaller than or equal to 90 degrees.

4. The display module according to claim 3, wherein the display screen comprises a square screen part, and a bent part located on a first side edge of the screen part and bent to a non-display surface of the screen part;

the ultrathin protective cover plate is attached to the screen part, and a side edge of the ultrathin protective cover plate close to the first side edge is bent towards one side of the rear cover; and the second part of the protective film coats an edge side surface of the ultrathin protective cover plate close to the first side edge and extends between the middle frame and the first folded edge of the rear cover.

5. The display module according to claim 1, wherein the second part of the protective film and the first folded edge of the rear cover are pasted and fixed.

6. The display module according to claim 5, wherein the second part of the protective film and the first folded edge of the rear cover are pasted through a double-faced adhesive tape.

7. The display module according to claim 1, wherein the second part is provided with an opening at a position between the middle frame and the first folded edge of the rear cover; and an inner side of the first folded edge is provided with a protruding part matched with the opening, and the protruding part is embedded into the opening.

8. The display module according to claim 7, wherein a shape of the ultrathin protective cover plate is rectangular, and two opposite long side edges of the ultrathin protective cover plate are bent towards one side of the rear cover; and the second part of the protective film comprises two parts, and the two parts are respectively located on two sides of the first part close to the two long side edges, and respectively coat side surfaces of the two long side edges of the ultrathin protective cover plate and extend between the middle frame and the first folded edge of the rear cover.

9. The display module according to claim 8, wherein each of the two parts is provided with a plurality of openings, and the plurality of openings are arranged and distributed along the long side edge of the ultrathin protective cover plate; and the inner side of the first folded edge is provided with a plurality of protruding parts matched with the plurality of openings in a one-to-one correspondence mode, and the protruding parts are embedded into the corresponding openings.

10. The display module according to claim 1, further comprising a clamp arranged in the region enclosed by the back plate of the rear cover and the first folded edge, and configured to clamp and fix the middle frame and the second part of the protective film.

11. The display module according to claim 10, wherein the middle frame comprises a main body part opposite to the back plate of the rear cover and used for bearing the display screen and the ultrathin protective cover plate, and a second folded edge bent from an edge of the main body part to one side of the back plate of the rear cover;

the second part of the protective film extends between the second folded edge of the middle frame and the first folded edge of the rear cover; and the clamp is a full-surrounded frame or a semi-surrounded frame arranged along the second folded edge of the middle frame, and is provided with a clamping groove opened facing away from one side of the back plate of the rear cover, and the clamping groove clamps the second part of the protective film and the second folded edge of the middle frame.

12. The display module according to claim 11, wherein the clamp is an elastomer; and an opening size of the clamping groove is smaller than an internal size of the clamping groove.

13. The display module according to claim 10, wherein the clamp and the rear cover are pasted and fixed.

14. The display module according to claim 1, wherein the ultrathin protective cover plate is ultra-thin glass.

15. The display module according to claim 1, wherein the protective film comprises a transparent polyimide film or a terephthalic acid plastic film.

16. The display module according to claim 1, further comprising a plastic diaphragm located between the display screen and the ultrathin protective cover plate, wherein the plastic diaphragm comprises a transparent polyimide film or a terephthalic acid plastic film.

17. A display device, comprising a display module, wherein the display module comprises:

a rear cover and a middle frame; and a display screen, an ultrathin protective cover plate and a protective film which are located on a side of the middle frame facing away from the rear cover and stacked in sequence; wherein the rear cover has a back plate and a first folded edge bent and extending from an edge of the back plate to one side of the display screen;

the middle frame is located in a region enclosed by the back plate and the first folded edge;

the ultrathin protective cover plate has a first surface facing away from one side of the display screen and a side surface located on an edge; and the protective film comprises a first part attached to the first surface of the ultrathin protective cover plate, and a second part coating the side surface of the ultrathin protective cover plate and extending between the middle frame and the first folded edge of the rear cover.

18. The display device according to claim 17, wherein a shape of the ultrathin protective cover plate is square, and at least one side edge of the ultrathin protective cover plate is bent towards one side of the rear cover; and the second part of the protective film coats an edge side surface of the at least one side edge of the ultrathin protective cover plate and extends between the middle frame and the first folded edge of the rear cover.

19. The display device according to claim 18, wherein a bending angle of the edge of the ultrathin protective cover plate towards one side of the rear cover is smaller than or equal to 90 degrees.

20. The display device according to claim 19, wherein the display screen comprises a square screen part, and a bent part located on a first side edge of the screen part and bent to a non-display surface of the screen part;

the ultrathin protective cover plate is attached to the screen part, and a side edge of the ultrathin protective cover plate close to the first side edge is bent towards one side of the rear cover; and the second part of the protective film coats an edge side surface of the ultrathin protective cover plate close to the first side edge and extends between the middle frame and the first folded edge of the rear cover.

* * * * *